United States Patent Office 2,827,377
Patented Mar. 18, 1958

2,827,377

ANIMAL FEED COMPOSITION

Douglas V. Frost, Waukegan, Ill., assignor to Abbott Laboratories, Chicago, Ill., a corporation of Illinois No Drawing. Application September 2, 1953
Serial No. 378,165

12 Claims. (Cl. 99—4)

This invention relates to an improved composition of matter and more particularly to improved animal feed compositions.

In prudent poultry management it has become more generally the practice to feed poultry on rations made with solvent extracted soy bean oil meal much of which is of necessity stored for prolonged periods and to incorporate in the poultry feeds various medicinal compounds and antibiotics for the purpose of stimulating growth or decreasing the incidence of certain common poultry diseases such as coccidiosis and blackhead. It has now been observed, however, that certain of the poultry which have been raised under actual commercial conditions on the present day feed mixtures, including those containing feed additives, such as the sulfa drugs, certain antibiotics, and the arsonic acids, which are intended to increase the rate of growth or decrease the incidence of diseases such as coccidiosis, blackhead, and the like, exhibit a subnormal prothrombin blood level which has a very detrimental effect on the health of the poultry and which greatly reduces their thriftiness and which cannot be completely corrected by feeding poultry the N. R. C. recommended amounts of menadione.

It is therefore an object of the present invention to provide an improved animal feed composition containing as an essential ingredient thereof a stable compound capable of counteracting the tendency of poultry raised on present day feed rations to have subnormal prothrombin blood levels.

It is a further object of the invention to provide an animal feed containing an additive which is capable of raising the prothrombin blood level when dispersed throughout the feed composition and which retains substantially its original prothrombin activity on exposure to air and sunlight.

Other objects of the invention will be apparent from the detailed description and claims to follow.

It has been discovered that the unthriftiness of poultry resulting from subnormal prothrombin blood levels can be overcome by providing the usual commercial poultry feed compositions with a small amount of a solid, stabilized, water soluble addition product of 2-methyl-1,4-naphthoquinone with a water soluble bisulfite salt which is formed in the presence of an excess of the bisulfite salt. Poultry feed compositions have dispersed throughout one ton of poultry feed approximately one gram (.00011% by weight) of the 2-methyl-1,4-naphthoquinone bisulfite addition product formed in the presence of a molal excess of bisulfite salt is capable of preventing the observed subnormal prothrombin blood levels in poultry which is associated with the use in animal feeds of solvent extracted soy bean oil meal and feed additive compositions, such as sulfa drugs as coccidiostats and certain antibiotics and arsonic acids as growth promoters. Feed additive compositions of the foregoing type appear to disturb the normal flora in the digestive tract of the poultry and accentuate subnormal prothrombin blood levels in the birds which may be the result of abnormal or deficient dietary conditions associated with present day rations. Amounts of the stable 2-methyl-1,4-naphthoquinone bisulfite addition product in excess of the foregoing specified amount and including amounts of about .001% by weight can be used without serious or detrimental effects on poultry, but the use of amounts in excess of about .001% by weight of the stable addition product are uneconomical and do not contribute a proportionate increase in the degree of protection afforded. The absolute minimal concentrations of the stable bisulfite compounds which can be used for poultry have not been accurately established but appear to be not substantially lower than .00001% by weight of the stable 2-methyl-1,4-naphthoquinone in the feed composition.

As an illustration of a typical poultry feed composition of the present invention, but without in any way limiting the invention to the particular ingredients or proportions specified, the following specific example is set forth:

| | |
|---|---:|
| Yellow corn meal_____pounds__ | 1200.0 |
| Soybean oil meal (44% solvent extracted) do____ | 700.0 |
| Steamed bone meal_____do____ | 50.0 |
| Limestone flour_____do____ | 30.0 |
| Iodized salt_____do____ | 20.0 |
| Manganese sulfate_____do____ | 0.06 |
| Cod liver oil concentrate_____do____ | 0.4 |
| Sulfaquinoxaline _____do____ | .30 |
| Riboflavin _____mg__ | 3000 |
| Vitamin $B_{12}$, crystalline_____mg__ | 15000 |
| 2-methyl-1,4 - naphthoquinone bisulfite addition product_____gram__ | 1 |

The foregoing ingredients are thoroughly mixed in the conventional manner and placed in the usual containers without employing special equipment or means for protecting the feed additive.

The foregoing feed composition containing a stable bisulfite addition product retains its ability to prevent subnormal prothrombin blood levels for several months and can be fed to the poultry in the usual manner without observing special handling techniques.

The stable 2-methyl-1,4-naphthoquinone bisulfite addition product used in the above feed composition is conveniently prepared by grinding two mols of sodium bisulfite into a fine powder capable of passing through a standard 30 mesh screen and one mol of 2-methyl-1,4-naphthoquinone is added to the powdered sodium bisulfite and the mixture ground until thoroughly mixed. About 16 mols of distilled water are added to the mixture and mixing is continued until a thick paste is formed. This normally requires about one-half hour of mixing. The paste is then placed on enamel trays in a thin layer and dried at a moderate temperature. Highly satisfactory results are obtained by drying at a temperature between about 45 and 50° C. either under vacuum or in a current of air. Drying temperatures substantially in excess of 60° C. should be avoided. While not essential, if it is desired to remove discoloring side reaction products, the powdered reaction product can be suspended in about 15 mols of alcohol and the suspension agitated for about 4 hours during which time the side reaction products dissolve in the alcohol. The ethyl alcohol used need not be absolute alcohol and may contain about 5% water. At the end of the agitation period the mixture is filtered and rinsed with ethyl alcohol and dried at a temperature of preferably about 45–50° C.

In place of an alkali metal ion in the bisulfite salt other ions which form innocuous water soluble bisulfite salts can be substituted therefor including alkaline earth metals such as calcium; nitrogen groups such as ammonium and substituted ammonium including the alkylamines and alkanolamines. The 2-methyl-1,4-naphthoquinone bisulfite addition products of the above type which are formed in the presence of an excess of bisulfite, and preferably of about a molal excess of a bisulfite salt of the above type possess the necessary stability and prothrombin activity which is required in an animal feed such as poultry feed. The said addition product when combined in a poultry feed composition provides a safe, stable, low cost composition having consistently high vitamin K activity to feeds of otherwise uncertain adequacy.

It should be understood that the ingredients of the nutritional vehicle of the feed composition of the present invention containing the herein disclosed stable water soluble 2-methyl-1,4-naphthoquinone bisulfite addition product can also include in combination with or in place of the above specified ingredients other conventional feed ingredients including ground barley, ground wheat, ground kafir and milo, bone scraps, corn meal, corn gluten meal, cane feeding molasses, condensed fish solubles containing fish liver and glandular products, fish meal, yellow hominy feed, and inorganic mineral salts. Also other feed additives can be incorporated in the feed composition of the present invention including D-activated animal sterol (source of vitamin D–3), vitamin $B_{12}$ supplement, procaine penicillin, riboflavin supplement, calcium pantothenate, niacin, choline chloride, 3-nitro-4-hydroxyphenylarsonic acid, phenylarsonic acid, halogenated phenylarsonic acid, p-hydroxy phenylarsonic acid, the alkylenediamine salts of halo-phenylarsonic acid, and arsanilic acid.

While the specific embodiment of the present invention has been particularly concerned with poultry feed compositions, the present invention can also be embodied as a feed composition for other animals such as swine. Thus, others may readily adapt the invention for use under various conditions of service, employing one or more of the novel features disclosed or equivalents thereof without departing from the scope of the present invention as defined in the appanded claims. As at present advised with respect to the apparent scope of my invention, I desire to claim the following subject matter.

I claim:
1. An animal feed composition comprising a solid animal nutritional vehicle adapted for oral ingestion and having dispersed therethrough a small amount of a solid light and air stable water-soluble bisulfite addition product of 2-methyl-1,4-naphthoquinone and a water-soluble bisulfite salt, said bisulfite addition product having an excess of water-soluble bisulfite above a 1:1 molal ratio of 2-methyl-1,4-naphthoquinone to bisulfite without causing toxicity.

2. An animal feed composition comprising a solid animal nutritional vehicle adapted for oral ingestion and having dispersed therethrough at least about .00001% by weight of a solid light and air stable water-soluble bisulfite addition product of 2-methyl-1,4-naphthoquinone and a water-soluble bisulfite salt, said bisulfite addition product having an excess of water-soluble bisulfite above a 1:1 molal ratio of 2-methyl-1,4-naphthoquinone to bisulfite without causing toxicity.

3. An animal feed composition as in claim 2 wherein the water-soluble bisulfite salt is an alkali metal bisulfite.

4. An animal feed composition as in claim 2 wherein the water-soluble bisulfite salt is a sodium bisulfite.

5. An animal feed composition as in claim 2 wherein the water-soluble bisulfite salt is a calcium bisulfite.

6. An animal feed composition as in claim 2 wherein the water-soluble bisulfite salt is an alkanolamine bisulfite.

7. An animal feed composition as in claim 2 wherein the water-soluble bisulfite salt is an ethanolamine bisulfite.

8. A poultry feed composition comprising a solid poultry nutritional vehicle adapted for oral ingestion and having dispersed therethrough at least 0.00001% by weight of a solid water-soluble bisulfite addition product of 2-methyl-1,4-naphthoquinone and a water-soluble bisulfite salt; said bisulfite addition product having about a 30% excess by weight of water-soluble bisulfite above the 1:1 molal ratio of 2-methyl-1,4-naphthoquinone to bisulfite without causing toxicity.

9. A poultry feed composition as in claim 8 wherein the water-soluble bisulfite salt is an alkali metal bisulfite.

10. A poultry feed composition as in claim 8 wherein the water-soluble bisulfite salt is a sodium bisulfite.

11. A poultry feed composition comprising a poultry feed containing sulfaquinoxaline as a coccidiostat and having dispersed therethrough at least about 0.00001% by weight of a solid water-soluble bisulfite addition product of 2-methyl-1,4-naphthoquinone and a water-soluble bisulfite salt; said bisulfite addition product having about a 30% excess by weight water-soluble bisulfite above the 1:1 molal ratio of 2-methyl-1,4-naphthoquinone to bisulfite without causing toxicity.

12. A poultry feed composition as in claim 11 wherein the water-soluble bisulfite salt is sodium bisulfite.

References Cited in the file of this patent
UNITED STATES PATENTS

| | | |
|---|---|---|
| 2,331,808 | Shelton et al. | Oct. 12, 1943 |
| 2,367,302 | Moore et al. | Jan. 16, 1945 |